UNITED STATES PATENT OFFICE.

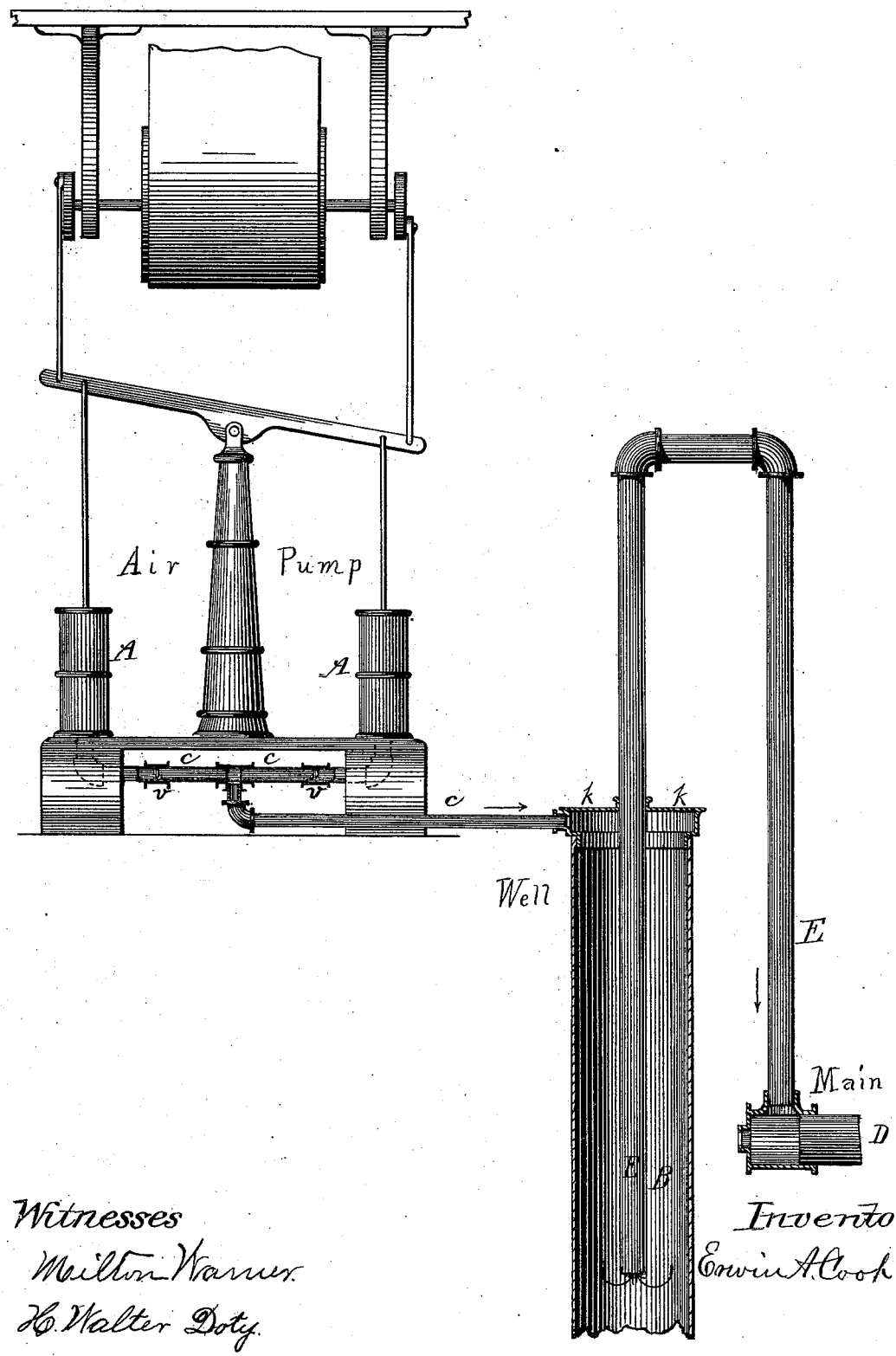

ERWIN A. COOK, OF McCOMB, ASSIGNOR OF ONE-HALF TO H. WALTER DOTY, OF FINDLAY, OHIO.

PROCESS OF ACCELERATING THE FLOW OF NATURAL GAS FROM GAS-WELLS.

SPECIFICATION forming part of Letters Patent No. 408,652, dated August 6, 1889.

Application filed May 23, 1888. Serial No. 274,856. (No model.)

*To all whom it may concern:*

Be it known that I, ERWIN A. COOK, a citizen of the United States, residing at McComb, in the county of Hancock and State of Ohio, have invented a new and useful Improvement in the Art or Process of Accelerating the Flow of Natural Gas from Gas-Wells, of which the following is a specification.

My invention relates to the process of accelerating the flow of natural gas from gas-wells of light pressure.

There are in many sections of Ohio, Indiana, and Pennsylvania the greatest number of old gas-wells of light pressure that are closed and sealed in and are regarded as almost worthless. I have by practical experiments ascertained and proved, first, that one part of natural gas intermingled with or incorporated into nineteen or more parts of air is very combustible, and will generate, when used for fuel, more heat than pure natural gas; second, that by injecting air into gas-wells of light pressure it will intermix with the gas therein and cause the same to flow freely, owing to the pressure and volume imparted to it by the air.

The present system of consuming natural gas is to take it directly from the well; and scientific men claim that all gas-wells by constant use will in ten or fifteen years cease to produce gas in sufficient quantity for utilization, especially as it has been demonstrated that the present system of using gas consumes about twenty times as much as is necessary. Therefore, according to my invention, I inject air into gas-wells of light pressure or old gas-wells to such an extent as to impart to the gas therein sufficient pressure and volume to cause it to flow therefrom into gas mains, tanks, or other receptacles, thereby making these wells very valuable; also, economizing gas by injecting air into it in such quantities as will increase the supply of natural gas now needlessly used some eighty or ninety per cent.

To carry my invention into effect, I use the following means, which will now be fully described in this specification, and are illustrated in the accompanying drawing, which is a perspective view of the device by which my process is effected.

A designates the air-pump, which is operated by motive power, as indicated, or in any suitable manner. The currents of air are generated in the pump and injected into the gas-well B through the pipes C. The pipes C are constructed in any suitable form, and have located in them, near said pumps, two check-valves $u$, for the purpose of preventing the air from re-entering the pump-cylinders. The mouth of the well B is sealed and capped by means of the casing-head $k$. It will readily be perceived that when the air is thus injected into the air-tight well it will naturally intermix with the gas, thereby causing it to expand and imparting to it volume and pressure which force it out through the exit-pipe E, thence into the main D. This process increases the supply of gas eighty or ninety per cent. in old wells or in gas-wells of light pressure, and makes them very valuable. When applied to gas-wells that have sufficient pressure to be utilized, it multiplies or increases their supply enormously. Because of said facts I attach special importance and value to my invention.

What I claim is—

The process of accelerating the flow and increasing the fuel and illuminating capacity of natural gas from gas-wells, which consists of injecting air into said wells in sufficient quantities to make it intermix with the natural gas therein and impart to said gas sufficient pressure and volume to cause the same to flow readily from the well, substantially as described and set forth.

In testimony whereof I hereunto affix my signature, this 18th day of May, A. D. 1888, in the presence of two witnesses.

ERWIN A. COOK.

Witnesses:
MILT WARNER,
J. B. MASTERS.